(12) United States Patent
Hayase et al.

(10) Patent No.: US 10,581,093 B2
(45) Date of Patent: Mar. 3, 2020

(54) FUEL CELL SYSTEM

(71) Applicant: TOYOTA JIDOSHA KABUSHIKI KAISHA, Toyota-shi, Aichi-ken (JP)

(72) Inventors: Yuichiro Hayase, Okazaki (JP); Takahiro Sadamitsu, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 162 days.

(21) Appl. No.: 15/833,052

(22) Filed: Dec. 6, 2017

(65) Prior Publication Data

US 2018/0175411 A1 Jun. 21, 2018

(30) Foreign Application Priority Data

Dec. 16, 2016 (JP) .................................. 2016-244302

(51) Int. Cl.
*H01M 8/04111* (2016.01)
*F16H 3/72* (2006.01)

(52) U.S. Cl.
CPC ......... *H01M 8/04111* (2013.01); *F16H 3/725* (2013.01); *F16H 2200/2007* (2013.01); *H01M 2250/20* (2013.01)

(58) Field of Classification Search
CPC ............... H01M 8/04; H01M 8/04111; H01M 2250/20; F05D 2260/40311; F05D 2220/76; Y02E 60/50; Y02E 60/52
See application file for complete search history.

(56) References Cited

U.S. PATENT DOCUMENTS

| | | | |
|---|---|---|---|
| 7,081,311 B2 * | 7/2006 | Kameya | H01M 8/04089 429/415 |
| 8,495,875 B2 * | 7/2013 | Triller | F02B 37/10 60/608 |
| 9,003,798 B2 * | 4/2015 | Yanagi | F01K 23/10 60/651 |
| 2002/0064695 A1 | 5/2002 | Raiser | |
| 2012/0007370 A1 | 1/2012 | Konrad et al. | |

FOREIGN PATENT DOCUMENTS

| | | | |
|---|---|---|---|
| EP | 3015676 A1 * | 5/2016 | .............. B60K 6/48 |
| JP | 06-076845 A | 3/1994 | |
| JP | 2002-158026 | 5/2002 | |

(Continued)

*Primary Examiner* — David R Morris
*Assistant Examiner* — James J Taylor, II
(74) *Attorney, Agent, or Firm* — Finnegan, Henderson, Farabow, Garrett & Dunner, LLP

(57) ABSTRACT

A fuel cell system includes: a fuel cell; a compressor; a turbine; an electric motor; a first transmission configured to change a gear ratio between the compressor and the electric motor, the first transmission being linked to the compressor rotating shaft and the motor rotating shaft; and a second transmission configured to change a gear ratio between the turbine and the electric motor, the second transmission being linked to the turbine rotating shaft and the motor rotating shaft. A gear ratio of the first transmission and a gear ratio of the second transmission are set such that a rotating speed of the electric motor is lower than a rotating speed of the compressor and a rotating speed of the turbine and such that a rotating speed of the compressor is higher than the rotating speed of the turbine.

12 Claims, 5 Drawing Sheets

(56) References Cited

FOREIGN PATENT DOCUMENTS

| JP | 2005-259459 A | 9/2005 |
| JP | 2008-210539 | 9/2008 |
| JP | 2010-20924 | 1/2010 |
| JP | 2012-518258 A | 8/2012 |
| JP | 2013-185547 A | 9/2013 |

\* cited by examiner

FUEL CELL SYSTEM

INCORPORATION BY REFERENCE

The disclosure of Japanese Patent Application No. 2016-244302 filed on Dec. 16, 2016 including the specification, drawings and abstract is incorporated herein by reference in its entirety.

BACKGROUND

1. Technical Field

The present disclosure relates to a fuel cell system.

2. Description of Related Art

Japanese Unexamined Patent Application Publication No. 2008-210539 (JP 2008-210539 A) discloses a fuel cell system including a compressor that is driven by a turbine. The compressor is disposed in a hydrogen circulation path of a fuel cell, and the turbine is disposed in a cathode exhaust gas path of an air path of the fuel cell. The compressor and the turbine are linked to each other through a turbine shaft. The turbine is driven by exhaust air exhausted from the fuel cell, drives the compressor through the turbine shaft, and circulates hydrogen.

SUMMARY

In general, the efficiencies of a turbine and a compressor depend on rotating speeds thereof, respectively. In addition, there are relatively many cases where a rotating speed at which the efficiency of a turbine is high is different from a rotating speed at which the efficiency of a compressor is high. However, in the technique of the related art, the turbine and the compressor are directly linked to each other through the turbine shaft. Therefore, there is a problem in that the efficiencies of the turbine and the compressor cannot be sufficiently improved.

A first aspect of the disclosure relates to a fuel cell system including: a fuel cell; a compressor configured to supply cathode gas to the fuel cell, the compressor including a compressor rotating shaft; a turbine configured to be driven by cathode exhaust gas exhausted from the fuel cell, the turbine including a turbine rotating shaft; an electric motor including a motor rotating shaft and being disposed between the compressor and the turbine; a first transmission configured to change a gear ratio between the compressor and the electric motor, the first transmission being linked to the compressor rotating shaft and the motor rotating shaft; and a second transmission configured to change a gear ratio between the turbine and the electric motor, the second transmission being linked to the turbine rotating shaft and the motor rotating shaft. A gear ratio of the first transmission and a gear ratio of the second transmission are set such that a rotating speed of the electric motor is lower than a rotating speed of the compressor and a rotating speed of the turbine and such that the rotating speed of the compressor is higher than the rotating speed of the turbine. According to the first aspect of the disclosure, using the first transmission and the second transmission, a rotating speed of the electric motor is set to be lower than a rotating speed of the compressor and a rotating speed of the turbine, and the rotating speed of the compressor is set to be higher than the rotating speed of the turbine. Therefore, the efficiencies of the compressor and the turbine can be sufficiently improved.

A second aspect of the disclosure relates to a fuel cell system including: a fuel cell; a compressor configured to supply cathode gas to the fuel cell, the compressor including a compressor rotating shaft; a turbine configured to be driven by cathode exhaust gas exhausted from the fuel cell, the turbine including a turbine rotating shaft; an electric motor including a motor rotating shaft and being disposed at a position on an opposite side of the compressor from the turbine; a first transmission configured to change a gear ratio between the compressor and the electric motor, the first transmission being linked to the compressor rotating shaft and the motor rotating shaft; and a second transmission configured to change a gear ratio between the turbine and the compressor, the second transmission being linked to the turbine rotating shaft and the compressor rotating shaft. A gear ratio of the first transmission and a gear ratio of the second transmission are set such that a rotating speed of the electric motor is lower than a rotating speed of the compressor and a rotating speed of the turbine and such that the rotating speed of the compressor is higher than the rotating speed of the turbine. According to the second aspect of the disclosure, using the first transmission and the second transmission, a rotating speed of the electric motor is set to be lower than a rotating speed of the compressor and a rotating speed of the turbine, and the rotating speed of the compressor is set to be higher than the rotating speed of the turbine. Therefore, the efficiencies of the compressor and the turbine can be sufficiently improved.

A third aspect of the disclosure relates to a fuel cell system including: a fuel cell; a compressor configured to supply cathode gas to the fuel cell, the compressor including a compressor rotating shaft; a turbine configured to be driven by cathode exhaust gas exhausted from the fuel cell, the turbine including a turbine rotating shaft; an electric motor including a motor rotating shaft and being disposed at a position on an opposite side of the turbine from the compressor; a first transmission configured to change a gear ratio between the compressor and the turbine, the first transmission being linked to the compressor rotating shaft and the turbine rotating shaft; and a second transmission configured to change a gear ratio between the electric motor and the turbine, the second transmission being linked to the motor rotating shaft and the turbine rotating shaft. A gear ratio of the first transmission and a gear ratio of the second transmission are set such that a rotating speed of the electric motor is lower than a rotating speed of the compressor and a rotating speed of the turbine and such that the rotating speed of the compressor is higher than the rotating speed of the turbine. According to the third aspect of the disclosure, using the first transmission and the second transmission, a rotating speed of the electric motor is set to be lower than a rotating speed of the compressor and a rotating speed of the turbine, and the rotating speed of the compressor is set to be higher than the rotating speed of the turbine. Therefore, the efficiencies of the compressor and the turbine can be sufficiently improved.

In the fuel cell system according to any one of the first to third aspects of the disclosure, the compressor rotating shaft, the motor rotating shaft, and the turbine rotating shaft may be arranged on the same straight line. According to the first to third aspects of the disclosure, a good balance during the rotation operations of the compressor, the turbine, and the electric motor can be maintained, and the devices can be more compactly combined.

The disclosure can be realized in various forms in addition to the above-described configurations. For example, the disclosure can be realized in the form of a compressor unit for a fuel cell or the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
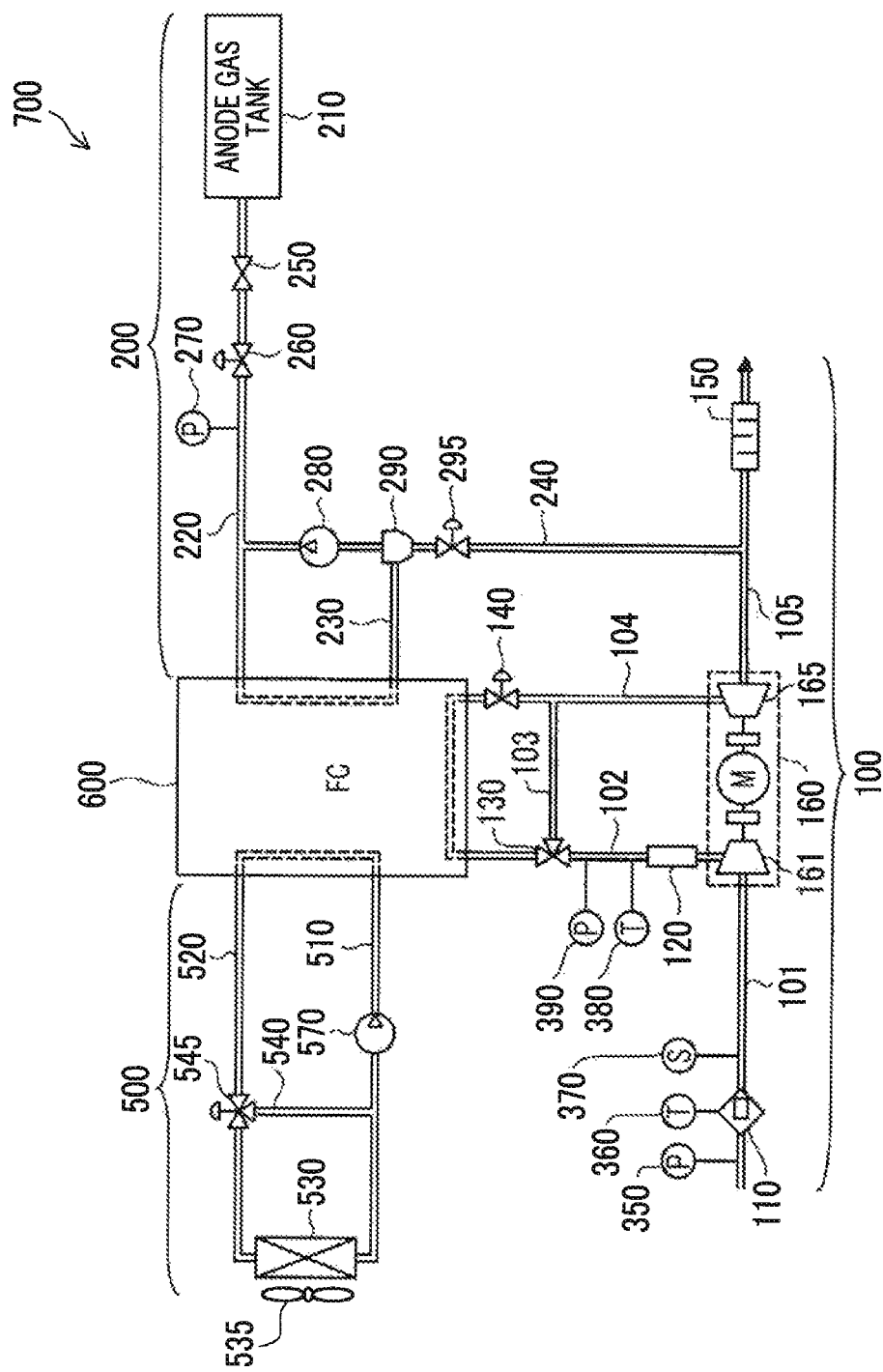
FIG. 1 is a diagram schematically showing a fuel cell system according to a first embodiment of the disclosure.

FIG. 1 is a diagram schematically showing a fuel cell system 700 according to a first embodiment of the disclosure. The fuel cell system 700 includes a fuel cell 600, an FC cooling system 500, an anode gas supply system 200, and a cathode gas supply-exhaust system 100. The fuel cell 600 generates power by causing anode gas and cathode gas to react with each other. The fuel cell system 700 may be a vehicle-mounted type mounted on a vehicle as a power source of the vehicle, or may be a stationary type.

The FC cooling system 500 includes a coolant supply pipe 510, a coolant exhaust pipe 520, a radiator 530, a bypass pipe 540, a three-way valve 545, and a coolant pump 570. Examples of a coolant include non-freezing water such as water or ethylene glycol and air. The coolant pump 570 is provided in the coolant supply pipe 510, and the coolant is supplied to the fuel cell 600. The three-way valve 545 is a valve for regulating a flow rate of the coolant supplied to the radiator 530 and the bypass pipe 540. In the radiator 530, a radiator fan 535 is provided.

The anode gas supply system 200 includes an anode gas tank 210, an anode gas supply pipe 220, an anode gas circulation pipe 230, a main stop valve 250, a pressure regulating valve 260, a supply gas pressure sensor 270, an anode gas pump 280, a gas-liquid separator 290, an exhaust-drain valve 295, and an exhaust-drain pipe 240. The anode gas tank 210 stores, for example, high-pressure hydrogen gas. The anode gas tank 210 is connected to the fuel cell 600 through the anode gas supply pipe 220. In the anode gas supply pipe 220, the main stop valve 250, the pressure regulating valve 260, and the supply gas pressure sensor 270 are provided in this order from the anode gas tank 210 side. The main stop valve 250 starts or stops the supply of the anode gas from the anode gas tank 210. The pressure regulating valve 260 regulates a pressure of the anode gas supplied to the fuel cell 600. The supply gas pressure sensor 270 measures a pressure of the anode gas supplied to the fuel cell 600.

The anode gas circulation pipe 230 is connected to the fuel cell 600 and the anode gas supply pipe 220, and circulates anode exhaust gas exhausted from the fuel cell 600 to the anode gas supply pipe 220. In the anode gas circulation pipe 230, the gas-liquid separator 290 and the anode gas pump 280 are provided. The gas-liquid separator 290 separates liquid water from the anode exhaust gas including the liquid water that is exhausted from the fuel cell 600. In addition, impurity gas such as nitrogen gas included in the anode exhaust gas is also separated together with the liquid water. The anode exhaust gas including non-used hydrogen gas is driven by the anode gas pump 280 and is circulated to the anode gas supply pipe 220. The separated liquid water and nitrogen gas pass through the exhaust-drain valve 295 and the exhaust-drain pipe 240 that are connected to the gas-liquid separator 290, and are exhausted to the outside of the system.

The cathode gas supply-exhaust system 100 includes cathode gas supply pipes 101, 102, a bypass pipe 103, cathode gas exhaust pipes 104, 105, an air cleaner 110, an intercooler 120, a flow dividing valve 130, a pressure regulating valve 140, a silencer 150, and a compressor unit 160. The cathode gas supply-exhaust system 100 takes air (cathode gas) into the system using the compressor unit 160, and supplies the air to the fuel cell 600. Next, the cathode gas supply-exhaust system 100 exhausts non-used air (cathode exhaust gas) to the outside of the system.

In the first cathode gas supply pipe 101, the air cleaner 110, an atmospheric pressure sensor 350, an ambient temperature sensor 360, and an air flow meter 370. The air cleaner 110 removes dust when the cathode gas is taken in. The atmospheric pressure sensor 350 measures the atmospheric pressure. The ambient temperature sensor 360 measures a temperature of the cathode gas before the intake. The air flow meter 370 measures the amount of the cathode gas that is taken in. In the second cathode gas supply pipe 102, the intercooler 120, the flow dividing valve 130, a supply gas temperature sensor 380, and a supply gas pressure sensor 390 are provided. The intercooler 120 cools the cathode gas supplied to the fuel cell 600. The supply gas temperature sensor 380 measures a temperature of the cathode gas supplied to the fuel cell 600. The supply gas pressure sensor 390 measures a pressure of the cathode gas supplied to the fuel cell 600. The flow dividing valve 130 is connected to the bypass pipe 103 and divides and supplies the cathode gas to the fuel cell 600 and the bypass pipe 103.

In the first cathode gas exhaust pipe 104, the pressure regulating valve 140 is provided. A downstream portion of the bypass pipe 103 is connected to the first cathode gas exhaust pipe 104 that is provided downstream of the pressure regulating valve 140. The pressure regulating valve 140 regulates a pressure of the cathode gas supplied to the fuel cell 600. A downstream portion of the exhaust-drain pipe 240 in the anode gas supply system 200 is connected to the second cathode gas exhaust pipe 105. The silencer 150 is provided at an outlet of the second cathode gas exhaust pipe 105. The silencer 150 reduces an exhaust sound of the cathode exhaust gas.

The first cathode gas supply pipe 101 and the second cathode gas supply pipe 102 are connected to an inlet and an outlet of a compressor 161 in the compressor unit 160, respectively. The first cathode gas exhaust pipe 104 and the second cathode gas exhaust pipe 105 are connected to an inlet and an outlet of a turbine 165 in the compressor unit 160.

Figure 2:
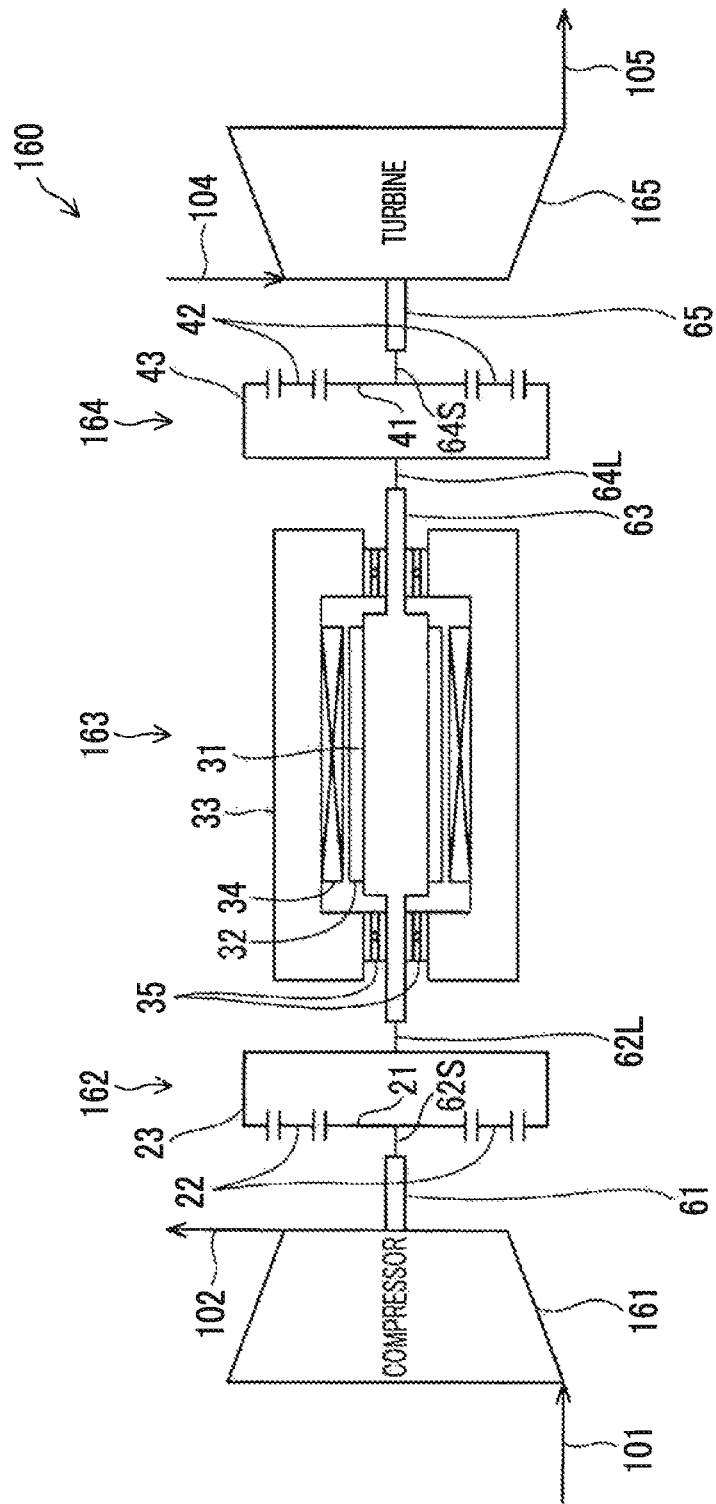
FIG. 2 is a diagram showing a compressor unit according to the first embodiment.

FIG. 2 is a diagram showing the compressor unit 160. The compressor unit 160 includes the compressor 161, the turbine 165, an electric motor 163, a first transmission 162, and a second transmission 164. The compressor 161 includes a compressor rotating shaft 61 and compresses gas according to rotation of the compressor rotating shaft 61. As the compressor 161, for example, a centrifugal compressor, an axial flow compressor, or a rotary compressor can be used. In order to obtain a sufficient pressure, it is preferable that a centrifugal compressor is used. The compressor 161 compresses the cathode gas supplied from the first cathode gas supply pipe 101, and supplies the compressed cathode gas to the fuel cell 600 (FIG. 1) through the second cathode gas supply pipe 102.

The turbine 165 is a gas turbine that includes a turbine rotating shaft 65 and is driven by the gas to rotate. As the turbine 165, for example, a radial turbine can be used. The turbine 165 is driven by the cathode exhaust gas to rotate, the cathode exhaust gas being exhausted from the fuel cell 600 through the first cathode gas exhaust pipe 104.

The electric motor 163 includes a motor rotating shaft 63 and is disposed between the compressor 161 and the turbine 165. The electric motor 163 includes: a rotor 31 that is formed integrally with the motor rotating shaft 63; a stator 33; and a bearing 35. A magnet 32 is provided on a surface of the rotor 31. An electromagnetic coil 34 is provided on an inner surface of the stator 33.

The first transmission 162 is disposed between the compressor 161 and the electric motor 163. In the embodiment, the first transmission 162 is a planetary gear transmission, and includes a central sun gear 21, a plurality of planetary gears 22 that is provided around the sun gear 21, and an outer circumferential ring gear 23. The sun gear 21 includes a sun gear rotating shaft 62S (first rotating shaft) linked to the compressor rotating shaft 61 of the compressor 161. The ring gear 23 includes a ring gear rotating shaft 62L linked to the motor rotating shaft 63 of the electric motor 163. The planetary gears 22 are linked to a planetary carrier (not shown) and supported. In the embodiment, the first transmission 162 changes a gear ratio between the compressor 161 and the electric motor 163 after fixing the planetary carrier such that the sun gear 21 and the ring gear 23 rotate individually. At this time, the compressor rotating shaft 61 and the motor rotating shaft 63 rotate individually in directions opposite to each other.

The second transmission 164 is a planetary gear transmission having substantially the same configuration as the first transmission 162, and is disposed between the turbine 165 and the electric motor 163. The second transmission 164 includes a sun gear 41, a plurality of planetary gears 42, and a ring gear 43. The sun gear 41 includes a sun gear rotating shaft 64S (second rotating shaft) linked to the turbine rotating shaft 65 of the turbine 165. The ring gear 43 includes a ring gear rotating shaft 64L linked to the motor rotating shaft 63 of the electric motor 163. As in the case of the first transmission 162, the second transmission 164 changes a gear ratio between the turbine 165 and the electric motor 163 after fixing the planetary carrier such that the sun gear 41 and the ring gear 43 rotate individually. At this time, the turbine rotating shaft 65 and the motor rotating shaft 63 rotate individually in directions opposite to each other.

The gear ratio of the first transmission 162 and the gear ratio of the second transmission 164 are set such that a rotating speed of the electric motor 163 is lower than a rotating speed of the compressor 161 and a rotating speed of the turbine 165 and such that the rotating speed of the compressor 161 is higher than the rotating speed of the turbine 165. The reason for this is as follows. The gear ratio of the first transmission 162 and the gear ratio of the second transmission 164 are fixed values, respectively. Either or both of the gear ratios of the transmissions 162, 164 may be variable.

In a case where the motor rotating shaft 63 of the electric motor 163 is rotated during the start of the compressor unit 160, the compressor rotating shaft 61 is rotated through the first transmission 162, and the compressor 161 is driven. During a normal operation, a rotating speed of the electric motor 163 is set to be lower than a rotating speed of the compressor 161. That is, a gear ratio G1 of the first transmission 162 set based on the electric motor 163 side is set to be higher than one. In a case where the compressor 161 starts to operate, the cathode gas supplied from the first cathode gas supply pipe 101 is compressed and is supplied to the fuel cell 600.

During the start of the compressor unit 160, the motor rotating shaft 63 of the electric motor 163 is rotated, the turbine rotating shaft 65 is rotated through the second transmission 164, and the turbine 165 is driven correspondingly. In a case where the cathode exhaust gas exhausted from the fuel cell 600 is supplied to the turbine 165 through the first cathode gas exhaust pipe 104, and the turbine 165 is driven by the cathode exhaust gas. In particular, in a case where the fuel cell 600 is sufficiently heated, the temperature of the cathode exhaust gas is quite high (for example, about 100° C.). Therefore, the turbine 165 is driven using heat energy of the cathode exhaust gas. In this state, the turbine 165 functions as a driving source that assists the rotation of the motor rotating shaft 63.

During a normal operation, a rotating speed of the electric motor 163 is set to be lower than a rotating speed of the turbine 165, and a rotating speed of the compressor 161 is set to be higher than the rotating speed of the turbine 165. That is, a second ratio G2 of the second transmission 164 set based on the electric motor 163 side is set to be higher than one and lower than the gear ratio G1 of the first transmission 162.

Here, the compressor 161 compresses the cathode gas under the atmospheric pressure, whereas the turbine 165 expands the compressed cathode exhaust gas. Therefore, the gas flow in the turbine 165 is slower than the gas flow in the compressor 161. Therefore, a rotating speed at which the efficiency of the turbine 165 is lower than a rotating speed at which the efficiency of the compressor 161 is high, and the maximum rotating speeds of the turbine 165 and the compressor 161 are set such that the high efficiency can be maintained. In general, the maximum rotating speed of the electric motor 163 is lower than the maximum rotating speeds of the compressor 161 and the turbine 165. Accordingly, for example, the compressor 161 having a maximum rotating speed of 150000 rpm to 250000 rpm, the turbine 165 having a maximum rotating speed of 75000 rpm to 150000 rpm, and the electric motor 163 having a maximum rotating speed of 15000 rpm to 20000 rpm can be used.

Figure 3:
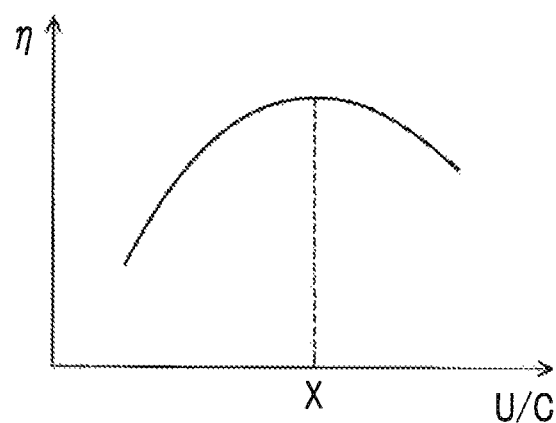
FIG. 3 is a diagram showing a relationship between an efficiency of a turbine and an adiabatic speed ratio.

FIG. 3 is a graph showing a relationship between an efficiency η of the turbine 165 and an adiabatic speed ratio (U/C). U represents a circumferential speed [m/s] of a moving blade of the turbine 165, and C represents a speed [m/s] depending on an adiabatic heat drop. In the example, in a case where the adiabatic speed ratio (U/C) reaches about a specific value X, the efficiency of the turbine 165 is the maximum. The rotating speed of the turbine 165 is proportional to the adiabatic speed ratio. In FIG. 3, conversely, in a case where the turbine 165 rotates at the same rotating speed as that of the compressor 161 (at a rotating speed that is higher than a rotating speed at which the adiabatic speed ratio (U/C) is X), the efficiency significantly decreases. In the embodiment, using the first transmission 162 and the second transmission 164, a rotating speed of the electric motor 163 is set to be lower than a rotating speed of the compressor 161 and a rotating speed of the turbine 165, and the rotating speed of the compressor 161 is set to be higher than the rotating speed of the turbine 165. As a result, the efficiencies of the electric motor 163, the compressor 161, and the turbine 165 can be sufficiently improved, respectively.

The compressor rotating shaft 61, the motor rotating shaft 63, and the turbine rotating shaft 65 are arranged on the same straight line. With this configuration, a good balance during the rotation operations of the compressor 161, the electric motor 163, and the turbine 165 can be maintained, and the stability can be sufficiently improved. By arranging the compressor rotating shaft 61, the motor rotating shaft 63, and the turbine rotating shaft 65 on the same straight line, the compressor unit 160 can be compactly designed. The compressor rotating shaft 61, the motor rotating shaft 63, and the turbine rotating shaft 65 does not have to be arranged on the same straight line.

The motor rotating shaft 63 disposed at the center among the compressor rotating shaft 61, the motor rotating shaft 63, and the turbine rotating shaft 65 rotates in a direction opposite to a rotating direction of the compressor rotating shaft 61 and the turbine rotating shaft 65. Accordingly, there is an advantageous effect in that a balance during the rotation operations of the compressor rotating shaft 61, the motor rotating shaft 63, and the turbine rotating shaft 65 is particularly good.

As the first transmission 162 and the second transmission 164, another kind of transmission may be used instead of the planetary gear transmission. A clutch may be provided between the second transmission 164 and the electric motor 163. With this configuration, the power consumption of the electric motor 163 can be further reduced by disengaging the turbine 165 and the second transmission from the electric motor 163 at the start of the operation of the compressor 161.

As described above, in the first embodiment, the gear ratio of the first transmission 162 and the gear ratio of the second transmission 164 are set such that a rotating speed of the electric motor 163 is lower than a rotating speed of the compressor 161 and a rotating speed of the turbine 165 and such that the rotating speed of the compressor 161 is higher than the rotating speed of the turbine 165. As a result, the efficiencies of the electric motor 163, the compressor 161, and the turbine 165 can be sufficiently improved, respectively.

Second Embodiment

Figure 4:
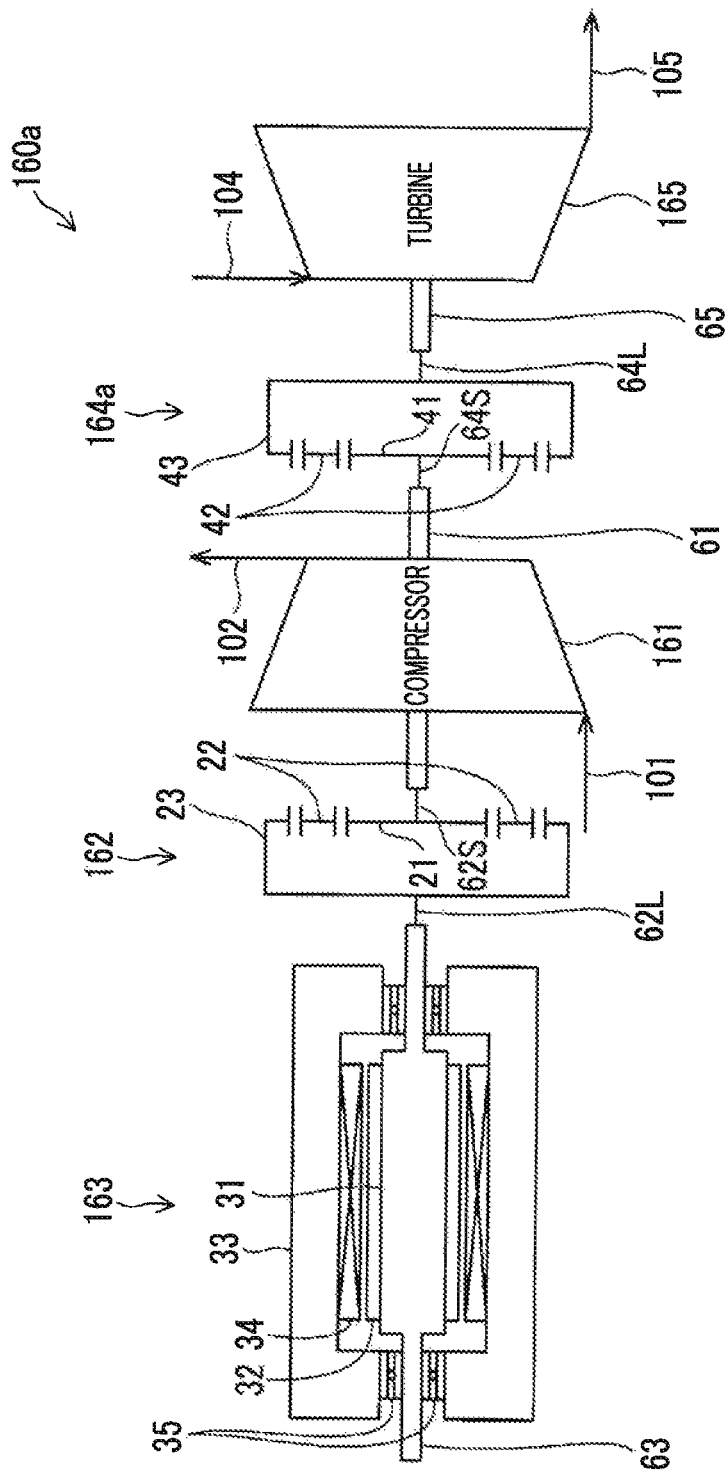
FIG. 4 is a diagram showing a compressor unit according to a second embodiment.

FIG. 4 is a diagram showing a compressor unit 160a according to a second embodiment, the diagram corresponding to FIG. 2 of the first embodiment. The second embodiment is different from the first embodiment shown in FIG. 2 in positions at which the compressor 161, the turbine 165, the electric motor 163, the first transmission 162, and a second transmission 164a are disposed, and the other configurations are substantially the same as those of the first embodiment.

In FIG. 4, the electric motor 163 is disposed at a position on the opposite side of the compressor 161 from the turbine 165. The second transmission 164a is disposed between the compressor 161 and the turbine 165. The sun gear rotating shaft 64S of the second transmission 164a is linked to the compressor rotating shaft 61, and the ring gear rotating shaft 64L thereof is linked to the turbine rotating shaft 65. The second transmission 164a changes a gear ratio between the turbine 165 and the compressor 161. In the second embodiment, the gear ratio of the first transmission 162 and the gear ratio of the second transmission 164a are also set such that a rotating speed of the electric motor 163 is lower than a rotating speed of the compressor 161 and a rotating speed of the turbine 165 and such that the rotating speed of the compressor 161 is higher than the rotating speed of the turbine 165. With this configuration, the efficiencies of the electric motor 163, the compressor 161, and the turbine 165 can be sufficiently improved, respectively.

Third Embodiment

Figure 5:
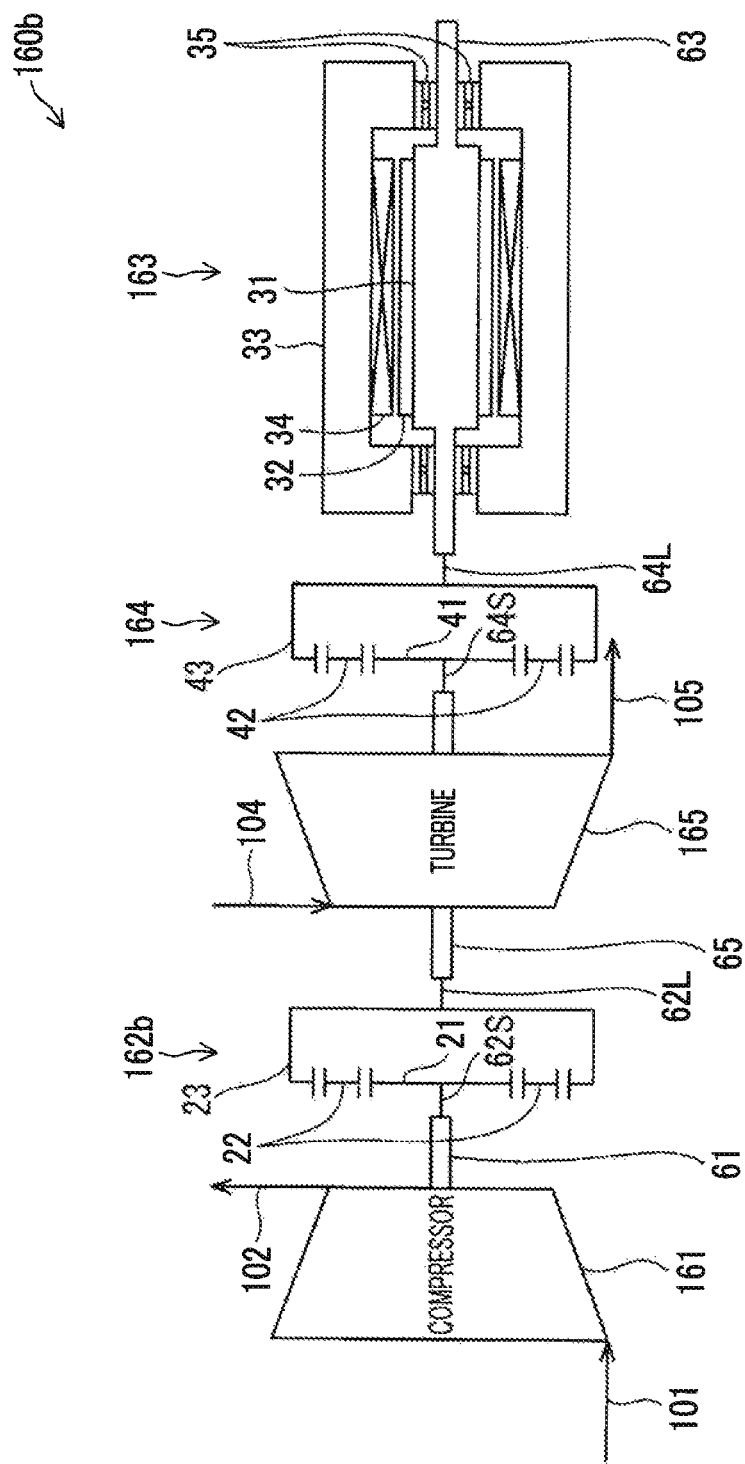
FIG. 5 is a diagram showing a compressor unit according to a third embodiment.

FIG. 5 is a diagram showing a compressor unit 160b according to a third embodiment, the diagram corresponding to FIG. 2 of the first embodiment. The second embodiment is different from the first embodiment shown in FIG. 2 in positions at which the compressor 161, the turbine 165, the electric motor 163, a first transmission 162b, and the second transmission 164 are disposed, and the other configurations are substantially the same as those of the first embodiment.

In FIG. 5, the electric motor 163 is disposed at a position on the opposite side of the turbine 165 from the compressor 161. The first transmission 162b is disposed between the compressor 161 and the turbine 165. The sun gear rotating shaft 62S of the first transmission 162b is linked to the compressor rotating shaft 61, and the ring gear rotating shaft 62L thereof is linked to the turbine rotating shaft 65. The first transmission 162b changes a gear ratio between the turbine 165 and the compressor 161. In the third embodiment, the gear ratio of the first transmission 162b and the gear ratio of the second transmission 164 are also set such that a rotating speed of the electric motor 163 is lower than a rotating speed of the compressor 161 and a rotating speed of the turbine 165 and such that the rotating speed of the compressor 161 is higher than the rotating speed of the turbine 165. With this configuration, the efficiencies of the electric motor 163, the compressor 161, and the turbine 165 can be sufficiently improved, respectively.

The disclosure is not limited to the above-described embodiments, and various configurations can be realized within a scope not departing from the scope of the disclosure. For example, in order to solve some or all of the above-described problems, or to achieve some or all of the above-described effects, the technical features in the embodiments corresponding to the technical features in the respective aspects described in "SUMMARY" can be appropriately replaced or combined with each other. Moreover, unless specified as indispensable features in this specification, the technical features can be appropriately removed.

What is claimed is:
1. A fuel cell system comprising:
a fuel cell;
a compressor configured to supply cathode gas to the fuel cell, the compressor including a compressor rotating shaft;
a turbine configured to be driven by the cathode gas that is not used by the fuel cell and is exhausted from the fuel cell, the turbine including a turbine rotating shaft;
an electric motor including a motor rotating shaft and being disposed between the compressor and the turbine;
a first transmission configured to change a gear ratio between the compressor and the electric motor, the first transmission being linked to the compressor rotating shaft and the motor rotating shaft; and
a second transmission configured to change a gear ratio between the turbine and the electric motor, the second transmission being linked to the turbine rotating shaft and the motor rotating shaft,
wherein the gear ratio of the first transmission and the gear ratio of the second transmission are set such that a rotating speed of the electric motor is lower than a rotating speed of the compressor and a rotating speed of the turbine and such that the rotating speed of the compressor is higher than the rotating speed of the turbine.

2. The fuel cell system according to claim 1, wherein the first transmission includes
a first sun gear that includes a first sun gear rotating shaft linked to the compressor rotating shaft of the compressor,
a first ring gear that includes a first ring gear rotating shaft linked to the motor rotating shaft of the electric motor, and
a plurality of first planetary gears provided around the first sun gear and in the first ring gear, the first planetary gears engaging with the first sun gear and the first ring gear.

3. The fuel cell system according to claim 1, wherein the second transmission includes
a second sun gear that includes a second sun gear rotating shaft linked to the turbine rotating shaft of the turbine,
a second ring gear that includes a second ring gear rotating shaft linked to the motor rotating shaft of the electric motor, and
a plurality of second planetary gears provided around the second sun gear and in the second ring gear, the secondary planetary gears engaging with the second sun gear and the second ring gear.

4. The fuel cell system according to claim 1, wherein the compressor rotating shaft, the motor rotating shaft, and the turbine rotating shaft are arranged on the same straight line.

5. A fuel cell system comprising:
a fuel cell;
a compressor configured to supply cathode gas to the fuel cell, the compressor including a compressor rotating shaft;
a turbine configured to be driven by cathode exhaust gas exhausted from the fuel cell, the turbine including a turbine rotating shaft;
an electric motor including a motor rotating shaft and being disposed at a position on an opposite side of the compressor from the turbine;
a first transmission configured to change a gear ratio between the compressor and the electric motor, the first transmission being linked to the compressor rotating shaft and the motor rotating shaft; and
a second transmission configured to change a gear ratio between the turbine and the compressor, the second transmission being linked to the turbine rotating shaft and the compressor rotating shaft,
wherein the gear ratio of the first transmission and the gear ratio of the second transmission are set such that a rotating speed of the electric motor is lower than a rotating speed of the compressor and a rotating speed of the turbine and such that the rotating speed of the compressor is higher than the rotating speed of the turbine.

6. The fuel cell system according to claim 5, wherein the first transmission includes a first sun gear that includes a first sun gear rotating shaft linked to the compressor rotating shaft of the compressor,
a first ring gear that includes a first ring gear rotating shaft linked to the motor rotating shaft of the electric motor, and
a plurality of first planetary gears provided around the first sun gear and in the first ring gear, the first planetary gears engaging with the first sun gear and the first ring gear.

7. The fuel cell system according to claim 5, wherein the second transmission includes
a second ring gear that includes a second ring gear rotating shaft linked to the turbine rotating shaft of the turbine,
a second sun gear that includes a second sun gear rotating shaft linked to the compressor rotating shaft of the compressor, and
a plurality of second planetary gears provided around the second sun gear and in the second ring gear, the secondary planetary gears engaging with the second sun gear and the second ring gear.

8. The fuel cell system according to claim 5, wherein the compressor rotating shaft, the motor rotating shaft, and the turbine rotating shaft are arranged on the same straight line.

9. A fuel cell system comprising:
a fuel cell;
a compressor configured to supply cathode gas to the fuel cell, the compressor including a compressor rotating shaft;
a turbine configured to be driven by cathode exhaust gas exhausted from the fuel cell, the turbine including a turbine rotating shaft;
an electric motor including a motor rotating shaft and being disposed at a position on an opposite side of the turbine from the compressor;
a first transmission configured to change a gear ratio between the compressor and the turbine, the first transmission being linked to the compressor rotating shaft and the turbine rotating shaft; and
a second transmission configured to change a gear ratio between the electric motor and the turbine, the second transmission being linked to the motor rotating shaft and the turbine rotating shaft,
wherein the gear ratio of the first transmission and the gear ratio of the second transmission are set such that a rotating speed of the electric motor is lower than a rotating speed of the compressor and a rotating speed of the turbine and such that the rotating speed of the compressor is higher than the rotating speed of the turbine.

10. The fuel cell system according to claim 9, wherein the first transmission includes
a first sun gear that includes a first sun gear rotating shaft linked to the compressor rotating shaft of the compressor,
a first ring gear that includes a first ring gear rotating shaft linked to the turbine rotating shaft of the turbine and,
a plurality of first planetary gears provided around the first sun gear and in the first ring gear, the first planetary gears engaging with the first sun gear and the first ring gear.

11. The fuel cell system according to claim 9, wherein the second transmission includes
a second sun gear that includes a second sun gear rotating shaft linked to the turbine rotating shaft of the turbine,
a second ring gear that includes a second ring gear rotating shaft linked to the motor rotating shaft of the electric motor, and a plurality of second planetary gears provided around the second sun gear and in the second ring gear, the secondary planetary gears engaging with the second sun gear and the second ring gear.

12. The fuel cell system according to claim 9, wherein the compressor rotating shaft, the motor rotating shaft, and the turbine rotating shaft are arranged on the same straight line.

* * * * *